(12) United States Patent
Matsuo et al.

(10) Patent No.: US 10,479,426 B2
(45) Date of Patent: Nov. 19, 2019

(54) CRAWLER

(71) Applicant: BRIDGESTONE CORPORATION, Chuo-ku, Tokyo (JP)

(72) Inventors: Shuichi Matsuo, Tokyo (JP); Kiyoshi Ikehara, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 1056 days.

(21) Appl. No.: 14/769,457

(22) PCT Filed: Feb. 25, 2014

(86) PCT No.: PCT/JP2014/054579
§ 371 (c)(1),
(2) Date: Aug. 21, 2015

(87) PCT Pub. No.: WO2014/129660
PCT Pub. Date: Aug. 28, 2014

(65) Prior Publication Data
US 2016/0001830 A1 Jan. 7, 2016

(30) Foreign Application Priority Data
Feb. 25, 2013 (JP) .................................. 2013-034966

(51) Int. Cl.
*B62D 55/24* (2006.01)
*B62D 55/253* (2006.01)

(52) U.S. Cl.
CPC ......... *B62D 55/244* (2013.01); *B62D 55/253* (2013.01)

(58) Field of Classification Search
CPC ...... B62D 55/18; B62D 55/24; B62D 55/244; B62D 55/253
See application file for complete search history.

(56) References Cited

U.S. PATENT DOCUMENTS 5,593,218 A * 1/1997 Katoh .................. B62D 55/244
  305/174
6,709,076 B2 * 3/2004 Sakai ..................... B62D 55/24
  156/137

(Continued)

FOREIGN PATENT DOCUMENTS

EP        1116644 A      7/2001
JP     H07-223564 A      8/1995

(Continued)

OTHER PUBLICATIONS

Translation for JPH07223564, Bridgestone Corp, Aug. 22, 1995.*

*Primary Examiner* — Brian L Swenson
(74) *Attorney, Agent, or Firm* — SOLARIS Intellectul Property Group, PLLC

(57) ABSTRACT

A rubber crawler including: an endless belt shaped rubber belt; a main cord layer that is disposed within the rubber belt, that is configured by plural main cords extending along a crawler peripheral direction and arranged side-by-side in a crawler width direction, and that is formed with an overlapping portion where both end, sides in the crawler peripheral direction overlap one another in a crawler thickness direction; and a stretching and contracting portion that is formed at the overlapping portion of the main cords, and is capable of stretching and contracting more in the crawler peripheral direction than other portions of the main cords, wherein the stretching and contracting portion includes a curved portion where the main cords are curved with an amplitude in the crawler width direction as viewed along the crawler thickness direction.

4 Claims, 10 Drawing Sheets

(56) References Cited

U.S. PATENT DOCUMENTS

| | | | |
|---|---|---|---|
| 2002/0163252 A1* | 11/2002 | Tsuru | B62D 55/244 |
| | | | 305/167 |
| 2002/0195876 A1 | 12/2002 | Sakai | |
| 2003/0160508 A1* | 8/2003 | Ueno | B62D 55/244 |
| | | | 305/165 |
| 2004/0026217 A1* | 2/2004 | Kondo | B62D 55/244 |
| | | | 198/804 |
| 2004/0104621 A1 | 6/2004 | Tsuru | |
| 2008/0272648 A1 | 11/2008 | Kondo et al. | |
| 2011/0169324 A1* | 7/2011 | Ijiri | B62D 55/244 |
| | | | 305/142 |

FOREIGN PATENT DOCUMENTS

| | | |
|---|---|---|
| JP | 09-109948 A | 4/1997 |
| JP | 2000-159162 A | 6/2000 |
| JP | 2003-002265 A | 1/2003 |
| JP | 2006-290301 A | 10/2006 |
| WO | 2006/090961 A | 8/2006 |

* cited by examiner

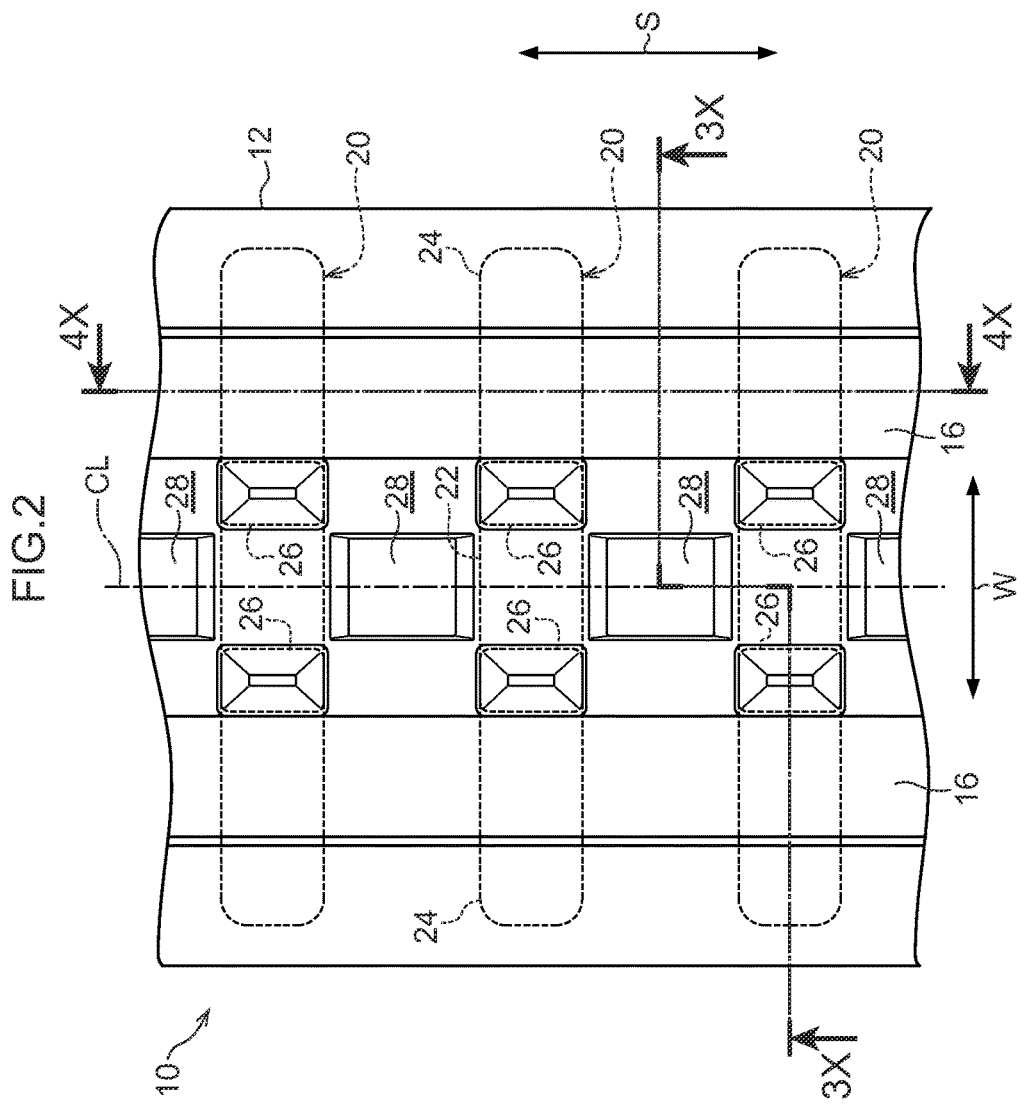

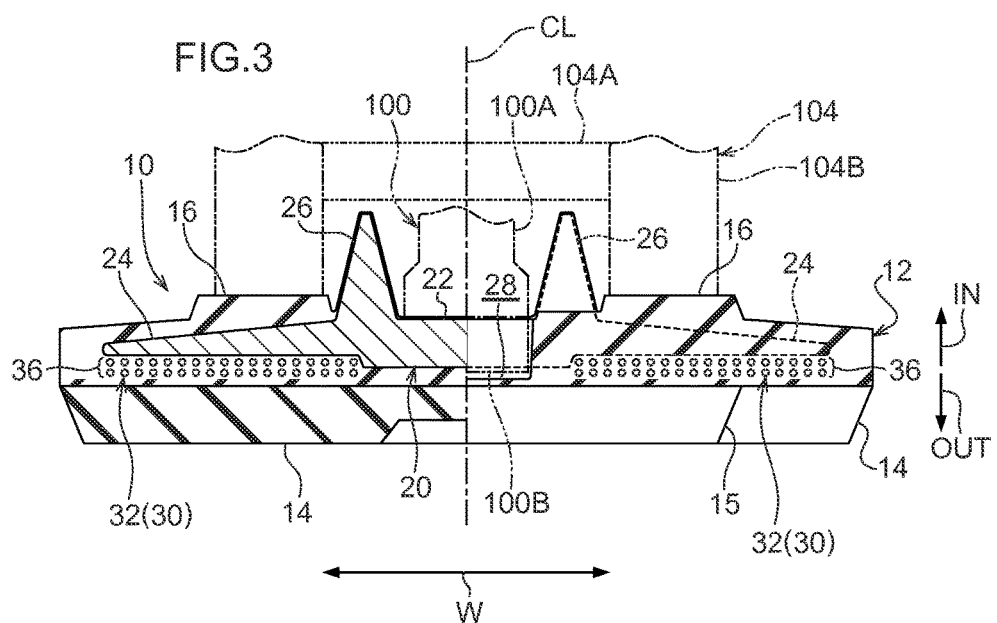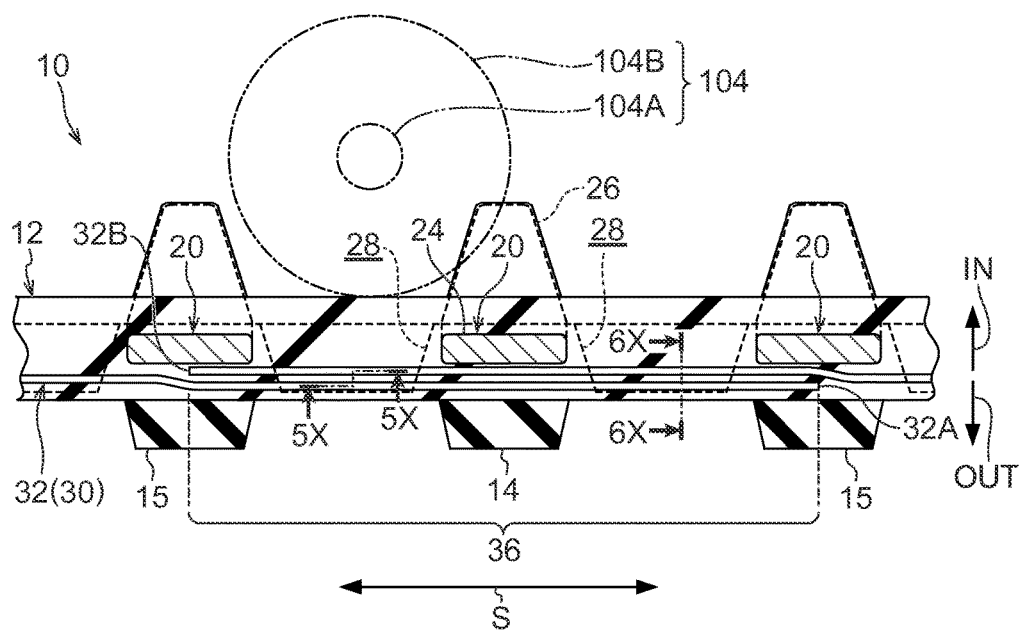

CRAWLER

TECHNICAL FIELD

The present invention relates to a crawler.

BACKGROUND ART

A main cord layer, configured by main cords extending along a crawler peripheral direction arranged side-by-side in the crawler width direction, is normally disposed inside a rubber crawler. A known structure of the main cord layer (for example, Japanese Patent Application Laid-Open (JP-A) No. H07-223564) is a structure in which both ends of the main cord layer in the crawler peripheral direction overlap with each other (referred to below as the " overlapping structure " as appropriate).

SUMMARY OF INVENTION

Technical Problem

Rubber crawlers including a main cord layer with the overlapping structure have higher bending rigidity at an overlapping portion than at other portions. Accordingly, when the overlapping portion is entrained around a drive wheel or an idle wheel, there is a tendency for excessive bending (bending with a small radius of curvature) to occur due to the different bending rigidity in the vicinity of boundaries between the overlapping portion and other portions (at the ends of the main cord layer).

An object of the present invention is to approach uniform bending rigidity along the crawler peripheral direction when a crawler including a main cord layer with an overlapping structure is entrained around a drive wheel or an idle wheel.

Solution to Problem

A crawler of a first aspect of the present invention includes: an endless-belt shaped elastic body; a main cord layer that is disposed within the elastic body, that is configured by plural main cords extending along an elastic body peripheral direction and arranged side-by-side in an elastic body width direction, and that is formed with an overlapping portion where both end sides of the main cord layer in the elastic body peripheral direction overlap one another in an elastic body thickness direction; and a stretching and contracting portion that is formed at the overlapping portion of the main cords, and is capable of stretching and contracting more in the elastic body peripheral direction than other portions of the main cords, wherein the stretching and contracting portion includes a curved portion where the main cords are curved with an amplitude in the elastic body width direction as viewed along the elastic body thickness direction.

Advantageous Effects of Invention

The crawler of the present invention is capable of approaching uniform bending rigidity along the crawler peripheral direction when entrained around a drive wheel or an idle wheel.

BRIEF DESCRIPTION OF DRAWINGS

FIG. 2 is a plan view of an inner peripheral face of the rubber crawler illustrated in FIG. 1.

FIG. 3 is a cross-section of the rubber crawler illustrated in FIG. 2, taken along line 3X-3X.

FIG. 4 is a cross-section of the rubber crawler illustrated in FIG. 2, taken along line 4X-4X.

DESCRIPTION OF EMBODIMENTS

First Exemplary Embodiment

Explanation follows regarding a crawler according to a first exemplary embodiment of the present invention.

Figure 1:
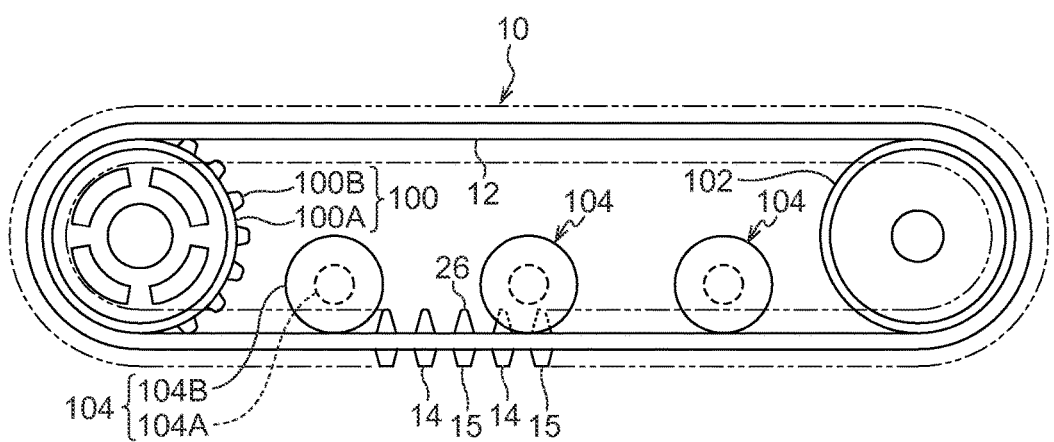
FIG. 1 is a side view of a rubber crawler of a first exemplary embodiment, as viewed from the side (along a crawler width direction).

As illustrated in FIG. 1, an endless rubber crawler 10, serving as an example of a crawler according to the first exemplary embodiment, is employed entrained around a sprocket 100, serving as an example of a drive wheel coupled to a drive shaft of a tracked vehicle that serves as a machine body, and around an idler 102, serving as an example of an idle wheel attached to the tracked vehicle so as to be freely rotatable. Plural rollers 104 (see FIG. 1) that are disposed between the sprocket 100 and the idler 102 and are attached to the tracked vehicle so as to be freely rotatable roll against an inner periphery of the rubber crawler 10.

In the present exemplary embodiment, the peripheral direction of the endless rubber crawler 10 (the arrow S direction in FIG. 2) is referred to as the "crawler peripheral direction", and the width direction of the rubber crawler 10 (the arrow W direction in FIG. 2) is referred to as the "crawler width direction". Note that the crawler peripheral direction (synonymous with the "length direction of the rubber crawler 10") and the crawler width direction are orthogonal to each other as viewed from the inner peripheral side or the outer peripheral side of the rubber crawler 10.

Moreover, in the present exemplary embodiment, the inner peripheral side of the rubber crawler 10 that is entrained in a loop around the sprocket 100, the idler 102, and the rollers 104 (the arrow IN direction side in FIG. 3 and FIG. 4) is referred to as the "crawler inner peripheral side", and the outer peripheral side of the rubber crawler 10 (the arrow OUT direction side in FIG. 3 and FIG. 4) is referred to as the "crawler outer peripheral side". Note that the arrow IN direction (the direction toward the inside of the loop) and the arrow OUT direction (the direction toward the outside of the loop) in FIG. 3 and FIG. 4 indicate an in-out direction of the rubber crawler 10 (synonymous with the "thickness direction of the rubber crawler 10") when in an entrained state.

In the present exemplary embodiment, the rubber crawler 10 is entrained around the sprocket 100 and the idler 102; however, the present invention is not limited to such a configuration. For example, depending on the placement of the sprocket 100, the idler 102, and the rollers 104, the rubber crawler 10 may be entrained around one or plural of the rollers 104 in addition to the sprocket 100 and the idler 102.

As illustrated in FIG. 1, the sprocket 100 is formed with teeth 100B at uniform intervals around a circumferential direction of an outer circumferential face of a disk shaped wheel portion 100A that is coupled to the drive shaft of the tracked vehicle. The sprocket 100 causes drive force from the tracked vehicle to act on the rubber crawler 10 (described in detail later), and circulates the rubber crawler 10 between the sprocket 100 and the idler 102.

The idler 102 is configured in a disk shape, and is attached to the tracked vehicle so as to be capable of rotating freely. The idler 102 is pressed in a direction away from the sprocket 100 by a pressing mechanism, not illustrated in the drawings, operated by hydraulics or the like provided on the tracked vehicle side, and maintains a constant tension (pull) in the rubber crawler 10.

The rollers 104 support the weight of the tracked vehicle, and are each configured including a shaft portion 104A that is attached to the tracked vehicle so as to be capable of rotating freely, and wheel portions 104B that are rim portions jutting out toward the outer peripheral sides from both end portions of the shaft portion 104A (see FIG. 3, FIG. 4).

The idler 102 and the rollers 104 rotate following the rubber crawler 10 circulating between the sprocket 100 and the idler 102.

As illustrated in FIG. 1, the rubber crawler 10 includes a rubber belt 12 formed from rubber in an endless belt shape. The rubber belt 12 of the present exemplary embodiment is an example of an endless belt shaped elastic body of the present invention. The peripheral direction, width direction, inner peripheral side, and outer peripheral side of the rubber belt 12 of the present exemplary embodiment correspond to the crawler peripheral direction, the crawler width direction, and crawler inner peripheral side, and the crawler outer peripheral side, respectively.

As illustrated in FIG. 2, plural cores 20 are embedded in the rubber belt 12 at intervals along the crawler peripheral direction (at uniform intervals in the present exemplary embodiment). The cores 20 of the present exemplary embodiment are formed from a metal material. In the present invention, the cores 20 may be configured from a material other than a metal material, as long as the cores 20 have adequate strength for the specifications of the rubber crawler 10. For example, the cores 20 may be formed from a resin material.

As illustrated in FIG. 3, each of the cores 20 is configured including a core central portion 22, a pair of core wings 24 respectively extending from both crawler width direction end portions of the core central portion 22 toward the crawler width direction outsides, and core projections 26 projecting out from a base side (a base portion in the present exemplary embodiment) of each core wing 24 toward the crawler inner peripheral side.

The core central portion 22 is a portion that bears load and drive force from the sprocket 100, and is therefore made thicker in the crawler in-out direction than the core wings 24. Although the core central portion 22 of the present exemplary embodiment is completely embedded within the rubber belt 12, the present invention is not limited to such a configuration, and a crawler inner peripheral side surface of the core central portion 22 may be exposed from the rubber belt 12.

A projection leading end portion side of each core projection 26 projects out from the rubber belt 12 toward the crawler inner peripheral side. This projecting portion of the core projection 26 is covered with rubber, using the same rubber material as the rubber belt 12. Note that the present invention is not limited to such a configuration, and the projecting portions of the core projections 26 may be configured so as not to be covered with rubber, or configured so as to be only partially covered with rubber.

The sprocket 100 and the idler 102 roll against the rubber crawler 10 between the pairs of core projections 26 of the rubber belt 12, in other words, over the core central portions 22. The pairs of core projections 26 are capable of restricting movement of the sprocket 100 and the idler 102 in the crawler width direction by making contact with the sprocket 100 and the idler 102. In other words, by making contact with the sprocket 100 and the idler 102, the core projections 26 are capable of suppressing displacement of the rubber crawler 10 (rubber belt 12) in the crawler width direction relative to the sprocket 100 and the idler 102.

In the present exemplary embodiment, as illustrated in FIG. 2, a straight line passing through the crawler width direction center of the core central portions 22 of the cores 20 (referred to below as the "core center line" as appropriate) is substantially aligned with a straight line passing through the crawler width direction center of the rubber belt 12 (referred to below as the "center line CL"). Note that the present invention is not limited to such a configuration, and the core center line of the cores 20 may be offset in the crawler width direction with respect to the center line CL of the rubber belt 12. In the present exemplary embodiment, the crawler width direction inside refers to a side approaching, and the crawler width direction outsides refer to sides further from, the center line CL in the crawler width direction.

As illustrated in FIG. 2 and FIG. 3, respective roller-turned faces 16 that protrude toward the crawler inner peripheral side and extend along the crawler peripheral direction are formed on both crawler width direction sides of the pairs of core projections 26 of the rubber belt 12. Each roller-turned face 16 has a flat profile, and is turned by the rollers 104 described above.

As illustrated in FIG. 2, engagement recesses 28, into which the teeth 100B of the sprocket 100 are inserted and engage, are formed at the inner periphery of the rubber belt 12 between the core central portions 22 of adjacent cores 20 in the crawler peripheral direction. Note that the present invention is not limited to this configuration, and the rubber belt 12 may be formed with through holes that penetrate the rubber belt 12 from the inner peripheral side to the outer peripheral side of the crawler in place of the engagement recesses 28, such that the teeth 100B are inserted into and engage with the through holes. Moreover, slits penetrating from the inner peripheral side to the outer peripheral side of the crawler may be formed at the bottom of each engagement recess 28.

When the sprocket 100 rotates (is driven) in an inserted and engaged state of the teeth 100B of the sprocket 100 in the engagement recesses 28, drive force is input to the core central portions 22 of the cores 20 through the engagement recesses 28, and the drive force is transmitted to the rubber belt 12 (rubber crawler 10).

As illustrated in FIG. 1, at the outer periphery of the rubber belt 12, lugs 14, 15 that project out toward the crawler outer peripheral side are disposed alternately to each other at intervals along the crawler peripheral direction. The lugs 14, 15 are formed from a rubber material, and configure ground contact locations where the rubber crawler 10 contacts the ground. The respective lugs 14, 15 extend along the crawler width direction. As illustrated in FIG. 3, the lugs 14 are broader (have a greater length along the crawler width direction in the present example) than the lugs 15.

As illustrated in FIG. 4, the respective lugs 14, 15 are disposed at the crawler outer peripheral side of the cores 20. In other words, the cores 20 and the lugs 14 are mutually superimposed in the crawler in-out direction (crawler thickness direction). Note that the present invention is not limited to such a configuration, and the placement positions and shapes of the lugs may employ a known configuration.

Figure 6:
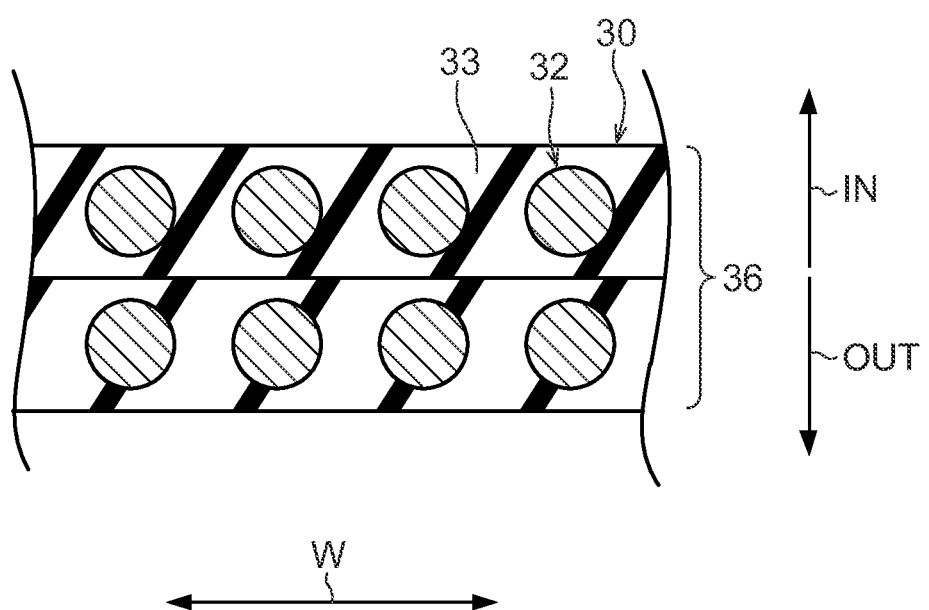
FIG. 6 is a cross-section of an overlapping portion of a main cord layer illustrated in FIG. 4, taken along line 6X-6X.

As illustrated in FIG. 3 and FIG. 4, respective main cord layers 30 are disposed inside the rubber belt 12 along the crawler peripheral direction, at the crawler outer peripheral side of the pairs of core wings 24. Each of the main cord layers 30 is configured by plural main cords 32 that extend along the crawler peripheral direction, and are arranged side-by-side in the crawler width direction. The main cords 32 arranged side-by-side in the crawler width direction are completely covered by a rubber material (illustrated by covering rubber 33 in FIG. 6). Specifically, each main cord layer 30 is configured by a main cord ply, in which plural of the main cords 32 are embedded in endless belt shaped rubber material. In the present exemplary embodiment, the covering rubber 33 employs the same rubber material as the rubber belt 12; however, the present invention is not limited to such a configuration, and the covering rubber 33 may employ a different rubber material to the rubber belt 12. The main cords 32 of the present exemplary embodiment are an example of main cords of the present invention, and the main cord layers 30 of the present exemplary embodiment are an example of a main cord layer of the present invention.

Moreover, the two crawler peripheral direction end sides of each main cord layer 30 overlap with each other in the crawler thickness direction (the overlapping portions of both end sides of the main cord layers 30 are referred to below as "overlapping portions 36", as appropriate). Specifically, the main cords 32 configuring each main cord layer 30 make a full circuit inside the rubber belt 12, and, as illustrated in FIG. 4, the sides of the two ends 32A, 32B thereof in the length direction (synonymous with the "two ends in the crawler peripheral direction") overlap with each other in the crawler thickness direction. Although in the present exemplary embodiment, the sides of the two ends 32A, 32B of each of the main cords 32 overlap with each other in the crawler thickness direction, the present invention is not limited to such a configuration, and the sides of the two ends 32A, 32B of each of the main cords 32 may be offset as long as the sides of the two ends of the main cord layers 30 including the covering rubber 33 overlap with each other in the crawler thickness direction. For example, the two ends 32A, 32B of each of the main cords 32 may be offset in the crawler width direction by the diameter of the main cord 32 or greater. Note that in such cases, the sides of the two ends 32A, 32B of the main cords 32 still appear to be overlapping with each other in the crawler thickness direction as viewed along the crawler thickness direction. The covering rubber 33 is present between the overlapping portions 36 of the main cord layers 30.

Figure 10:
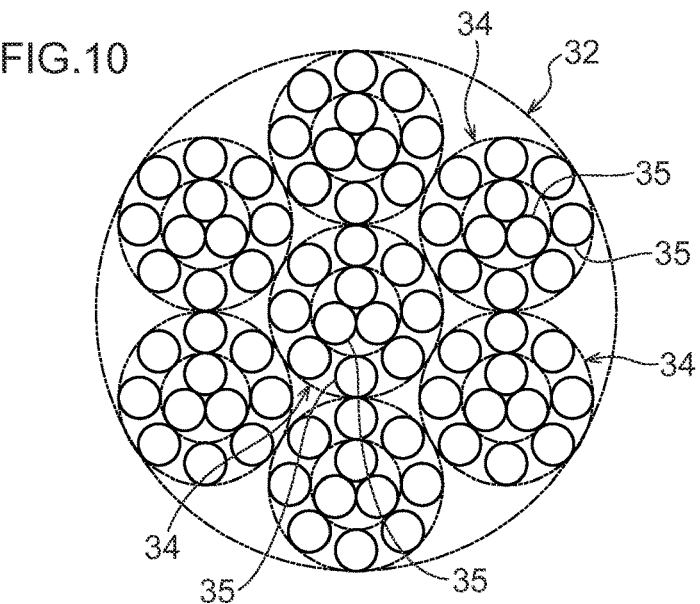
FIG. 10 is an enlarged cross-section of a main cord illustrated in FIG. 5.

As illustrated in FIG. 10, the main cords 32 of the present exemplary embodiment are each formed by twisting together plural strands 34. Each strand 34 is formed by twisting together plural filaments 35.

In the present exemplary embodiment, as an example, the main cords 32 employ steel cord with excellent tensile strength (steel cord formed by twisting together plural steel strands, each formed by twisting together plural steel filaments). Note that the present invention is not limited to such a configuration, and the main cords may employ organic fiber cord configured by organic fibers (for example, nylon fibers, aromatic polyamide fibers, or the like), as long as sufficient tensile strength and bending rigidity can be secured in the main cord layers 30.

Figure 5:
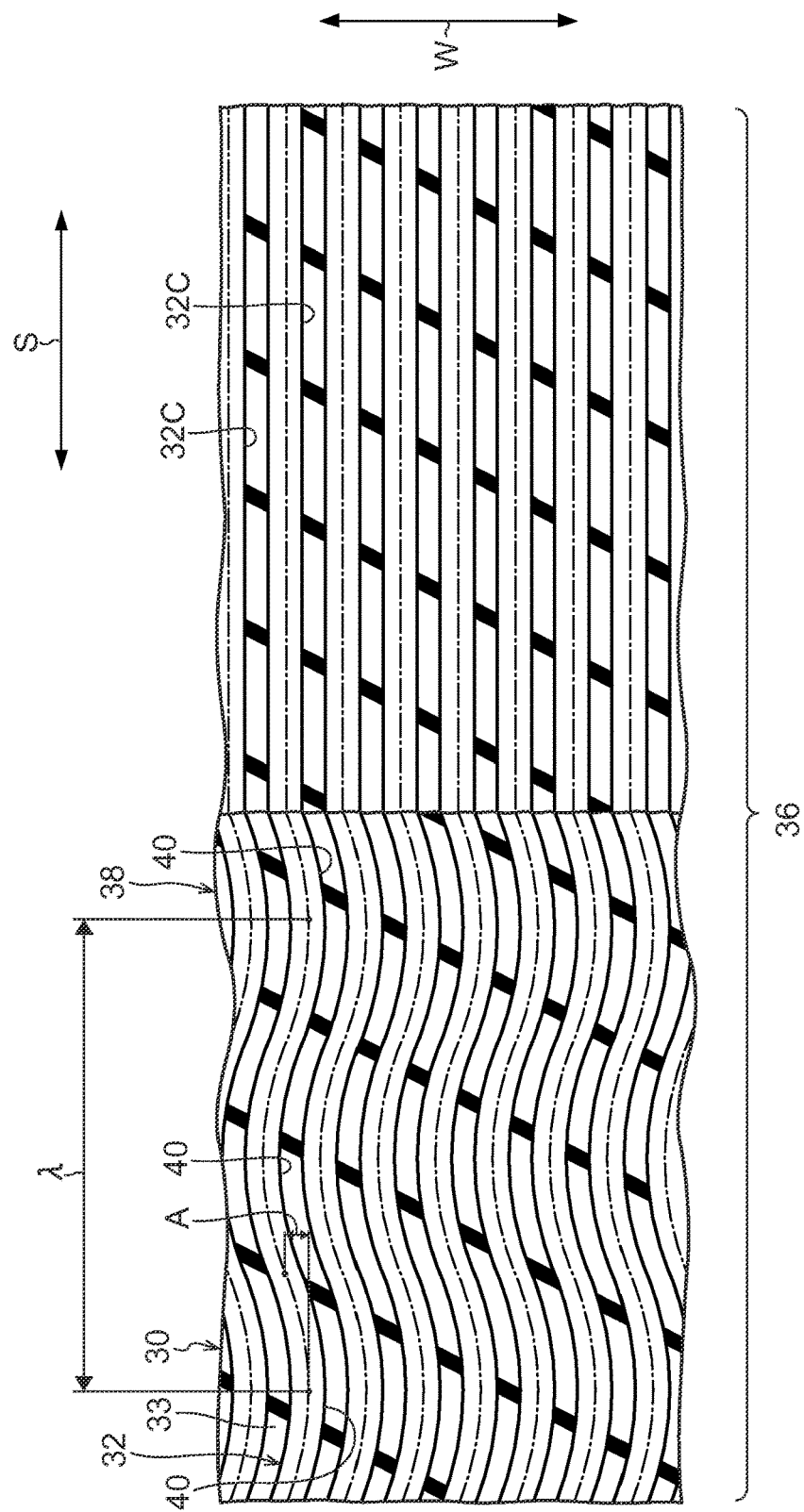
FIG. 5 is a cross-section of an overlapping portion of a main cord layer illustrated in FIG. 4, taken along line 5X-5X.

As illustrated in FIG. 5, stretching and contracting portions 38 that are capable of stretching and contracting more along the crawler peripheral direction than other portions of the main cords 32 are formed at the overlapping portions 36 (portions corresponding to the overlapping portions 36) of the main cords 32. Specifically, each of the main cords 32 is configured by a linear portion 32C extending along the crawler peripheral direction in a straight line, and a stretching and contracting portion 38 formed on one end side of the linear portion 32C. Note that the main cords 32 of the present exemplary embodiment are an example of main cords of the present invention, and the main cord layers 30 of the present exemplary embodiment are an example of a main cord layer of the present invention.

Each stretching and contracting portion 38 includes curved portions 40 in which the main cords 32 curve gently to give an amplitude in the crawler width direction as viewed along the crawler thickness direction. Specifically, in the present exemplary embodiment, each stretching and contracting portion 38 includes plural of the curved portions 40, and adjacent curved portions 40 along the crawler peripheral direction curve in opposite directions to each other as viewed along the crawler thickness direction (in other words, adjacent curved portions 40 have opposite amplitude directions to each other). The adjacent curved portions 40 of each stretching and contracting portion 38 run contiguously to each other along the crawler peripheral direction as viewed along the crawler thickness direction. Each of the stretching and contracting portions 38 of the present exemplary embodiment extends in a wavy pattern along the crawler peripheral direction as viewed along the crawler thickness direction (for example, in a sine wave pattern, a square wave pattern, or a zigzag pattern).

As illustrated in FIG. 5, the curved portions 40 of stretching and contracting portions 38 adjacent in the crawler width direction curve in the same direction as each other as viewed along the crawler thickness direction. Specifically, the wave profiles of the stretching and contracting portions 38 adjacent in the crawler width direction have the same phase and the same amplitude as each other. Note that the present invention is not limited to such a configuration, and, for example, the wave profiles of stretching and contracting portions 38 adjacent in the crawler width direction may have different amplitudes but be in phase, or may be out of phase but have the same amplitude, or may differ in both amplitude and phase. In FIG. 5, the amplitude of the wave profile of the stretching and contracting portions 38 of the main cords 32 (the amplitude of the curved portions 40) is labeled A, and the wavelength of the wave profile of the stretching and contracting portions 38 (twice the distance between the ends of a single curved portion 40) is labeled $\lambda$. In FIG. 5, the single dotted intermittent lines passing along the centers of the main cords 32 indicate respective center lines of the main cords 32.

In the present exemplary embodiment, the stretching and contracting portion 38 formed on the one end 32A side of each main cord 32 is superimposed from the crawler outer peripheral side on the other end 32B side of the main cord 32, namely, the linear portion 32C configuring another portion of the main cord 32.

As illustrated in FIG. 4, the one end 32A of each main cord 32 is disposed at the crawler outer peripheral side (on the lower side in FIG. 4) of the corresponding core 20 (specifically, the core wings 24) as viewed along the crawler width direction. Note that the present invention is not limited to such a configuration, and the one end 32A of the main cord 32 may be disposed between adjacent cores 20 in the crawler peripheral direction.

The other end 32B of each main cord 32 is disposed at the crawler inner peripheral side (on the upper side in FIG. 4) of the corresponding lug 14 or lug 15 as viewed along the crawler width direction. Note that the present invention is not limited to such a configuration, and the other end 32B of the main cord 32 may be disposed between the lugs 14 and lugs 15.

Each main cord layer 30 is formed by folding back a main cord ply in which the main cords 32 are embedded in belt shaped unvulcanized rubber material (that forms the covering rubber 33 after vulcanization), and the two end sides of the main cord ply are overlaid and adhered to each other by vulcanization. $A \times K \geq H$ is satisfied when A is the adhesion surface area of the overlapping portion 36, K is the permissible stress of the covering rubber 33, and H is the total strength of the main cord layers 30 (the strength of a single main cord 32 × the number of main cords 32 incorporated). Satisfying this relationship enables inter-layer separation in the overlapping portions 36 of the main cord layers 30 to be effectively suppressed.

Next, explanation follows regarding operation and advantageous effects of the rubber crawler 10 of the present exemplary embodiment.

In the rubber crawler 10, the rubber belt 12 is bent at portions entrained around the sprocket 100 and the idler 102, with the main cord layers 30 acting as a bending center plane. When this occurs, compression force acts at the crawler inner peripheral side, and tensile force acts at the crawler outer peripheral side, with reference to the main cord layers 30.

Figure 7:
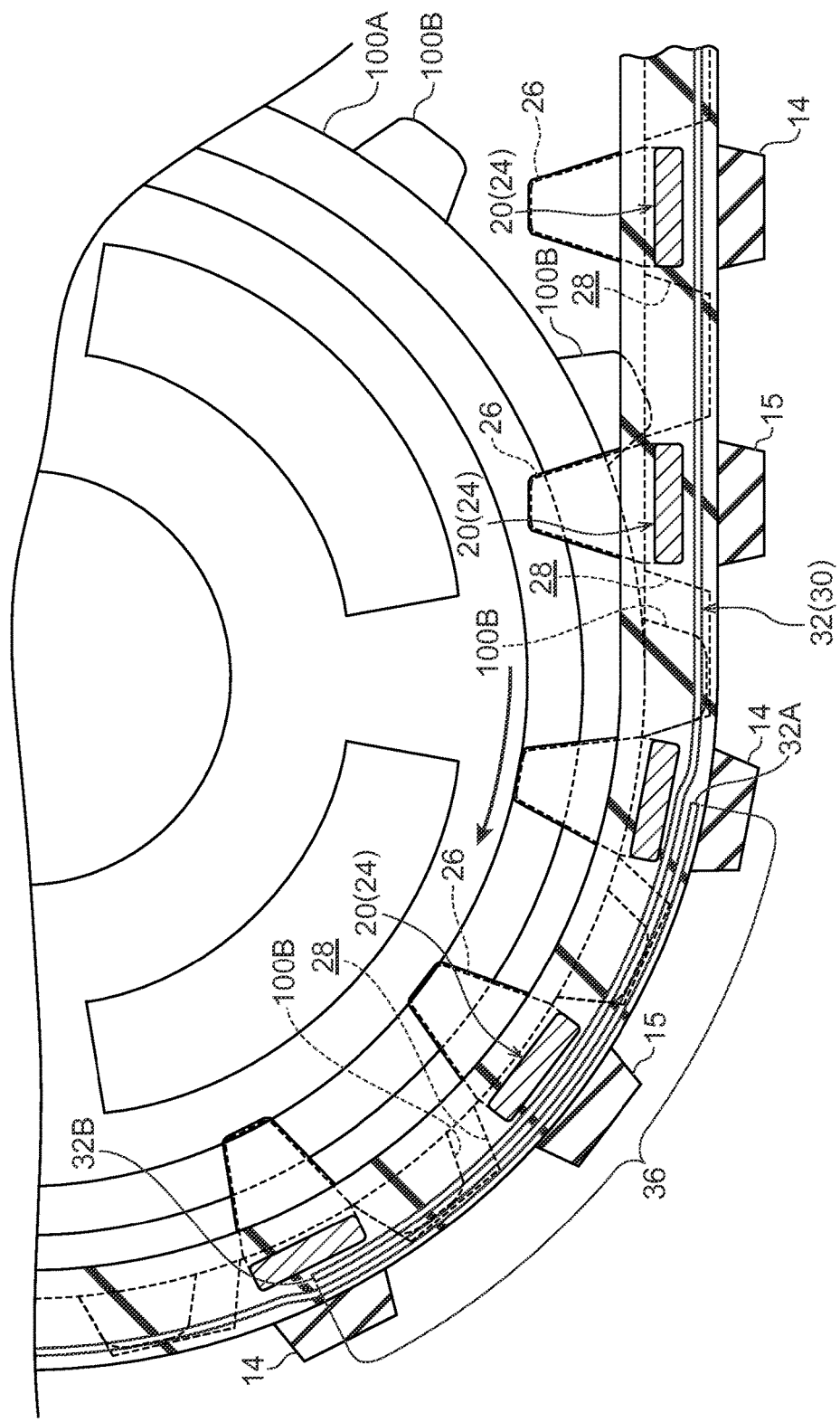
FIG. 7 is a side cross-section of a rubber crawler, corresponding to a cross-section taken along line 4X-4X in FIG. 2, illustrating a state in which an overlapping portion of the rubber crawler illustrated in FIG. 4 is entrained around a sprocket.
Figure 8:
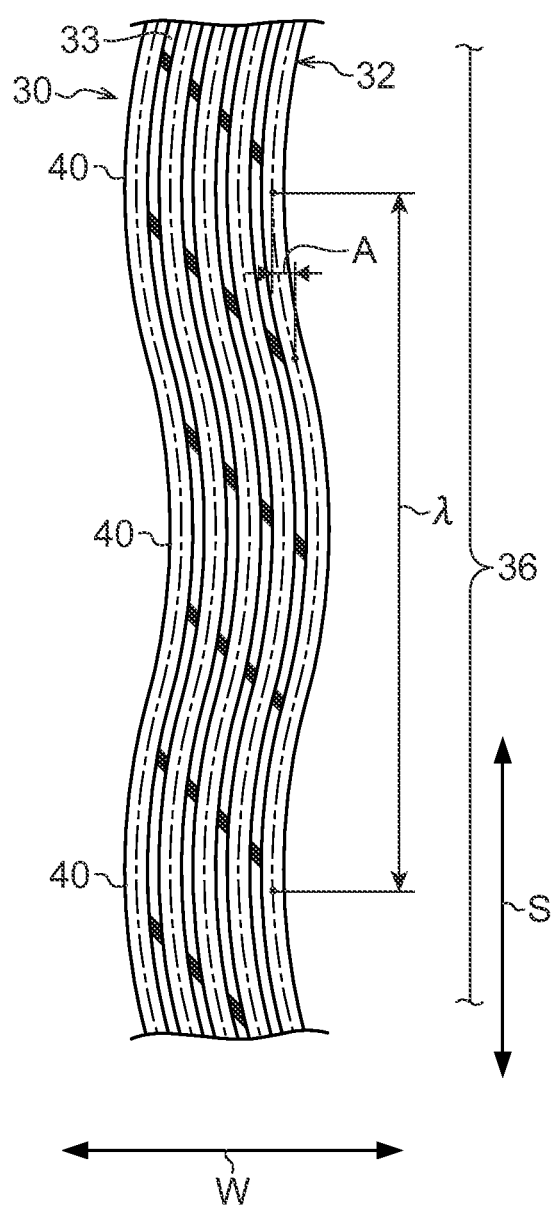
FIG. 8 is an opened-out view of stretching and contracting portions of main cords of a rubber crawler in the state illustrated in FIG. 7, illustrating a state in which the stretching and contracting portions have been stretched along the crawler peripheral direction, as viewed from the crawler outer peripheral side.

As illustrated in FIG. 7, in the rubber crawler 10, when the overlapping portions 36 of the main cords 32 are entrained around the sprocket 100 or the idler 102, the stretching and contracting portions 38 formed at the overlapping portion 36 of the main cords 32 (locations corresponding to the overlapping portions 36) stretch and contract in the crawler peripheral direction. Specifically, as illustrated in FIG. 8, tensile force in the crawler peripheral direction acts on the one end 32A side of the main cords 32 configuring the crawler inner peripheral side of the overlapping portions 36, and the plural curved portions 40 of the stretching and contracting portions 38 stretch in the crawler peripheral direction. The stretching and contracting portions 38 accordingly stretch in the crawler peripheral direction (the amplitude A decreases, and the wavelength $\lambda$ increases in length).

Accordingly, in the rubber crawler 10, the difference in bending rigidity between the overlapping portions 36 and other portions of the main cords 32 is reduced. Namely, the rubber crawler 10 can approach uniform bending rigidity in the crawler peripheral direction when entrained around the sprocket 100 or the idler 102.

When the overlapping portions 36 of the main cord layers 30 are entrained around the sprocket 100 or the idler 102, excessive bending originating in the vicinity of boundaries between the overlapping portions 36 and other portions of the main cord layers 30 (in the vicinities of the two ends 32A, 32B of each main cord 32) can accordingly be suppressed from occurring in the rubber belt 12. Bending fatigue can accordingly be reduced due to suppressing the repeated occurrence of excessive bending of part of the rubber belt 12 (in the vicinities of the two ends 32A, 32B of the main cords 32).

In the rubber crawler 10, when the overlapping portions 36 of the main cords 32 are entrained around the sprocket 100 or the idler 102, the stretching and contracting portions 38 formed on the one end 32A side of the main cords 32 stretch in the crawler peripheral direction with the other end 32B side configuring the crawler inner peripheral side of the overlapping portions 36 as a reference. Compression force acting on the other end 32B side of the main cords 32 is accordingly reduced.

Moreover, as described above, shear force acting in the rubber (covering rubber 33) in the overlapping portions 36 of the main cords 32 is reduced due to the stretching and contracting portions 38 of the main cords 32 stretching in the crawler peripheral direction. This thereby enables separation (inter-layer separation) to be suppressed in the overlapping portions 36 of the main cords 32.

Moreover, in the rubber crawler 10, when tensile force in the crawler peripheral direction acts on the stretching and contracting portions 38 of the main cords 32, the curved portions 40 that are curved with an amplitude in the crawler width direction are stretched along the crawler peripheral direction. However, when compression force in the crawler peripheral direction acts on the stretching and contracting portions 38 of the main cord 32, the curved portions 40 contract in the crawler peripheral direction. Namely, the rubber crawler 10 enables the occurrence of excessive bending in the rubber belt 12 in the vicinity of boundaries between the overlapping portions 36 and other portions of the main cord layers 30 to be suppressed by the simple configuration of providing the stretching and contracting portions 38 of the main cords 32 with the curved portions 40.

In the rubber crawler 10, adjacent curved portions 40 in the crawler peripheral direction curve in opposite directions to each other, thereby enabling the stretching and contracting portions 38 to stretch and contract in a well-balanced manner along the crawler peripheral direction in response to crawler peripheral direction input (tensile force and compression force) to the stretching and contracting portions 38. Moreover, the adjacent curved portions 40 run contiguously to each other along the crawler peripheral direction, thereby enabling the stretching and contraction amount of the stretching and contracting portions 38 in the crawler peripheral direction to be increased.

Moreover, in the rubber crawler 10, the curved portions 40 of stretching and contracting portions 38 adjacent in the crawler width direction curve in the same direction as each other as viewed along the crawler thickness direction. Namely, since the curved portions 40 of the adjacent stretching and contracting portions 38 have the same amplitude directions as each other, the respective stretching and contracting portions 38 can approach uniform stretching and contraction amounts along the crawler peripheral direction in the rubber crawler 10 of the present exemplary embodiment. In particular, the curved portions 40 curve gently, thereby enabling excessive bending to be suppressed from occurring in some of the curved portions 40 when the stretching and contracting portions 38 are compressed. Moreover, the wave profiles of stretching and contracting portions 38 adjacent in the crawler width direction have the same phase and the same amplitude as each other, thereby enabling the adjacent stretching and contracting portions 38 to approach uniform stretching and contraction amounts (stretching amounts in the present exemplary embodiment) along the crawler peripheral direction.

In the rubber crawler 10, each main cord 32 is configured by the linear portion 32C and the stretching and contracting portion 38, such that the tension of the main cord layer 30 is maintained by the linear portions 32C of each of the main cords 32, and low bending rigidity is maintained at the overlapping portion 36 of each main cord layer 30 by the stretching and contracting portions 38 of the respective main cords 32.

Moreover, in the rubber crawler 10, the one end 32A side of the main cords 32 formed with the stretching and contracting portions 38 are superimposed from the crawler outer peripheral side on the other end 32B side configured by the linear portions 32C, such that when the overlapping portions 36 are entrained around the sprocket 100 or the idler 102, the stretching and contracting portions 38 formed on the one end 32A side of the main cords 32 stretch in the crawler peripheral direction about the other end side of the main cord layer 30 as a reference. Compression force (compressive stress) acting on the other end 32B side of the main cords 32 when the overlapping portions 36 are bent is accordingly reduced in the rubber crawler 10.

Figure 9:
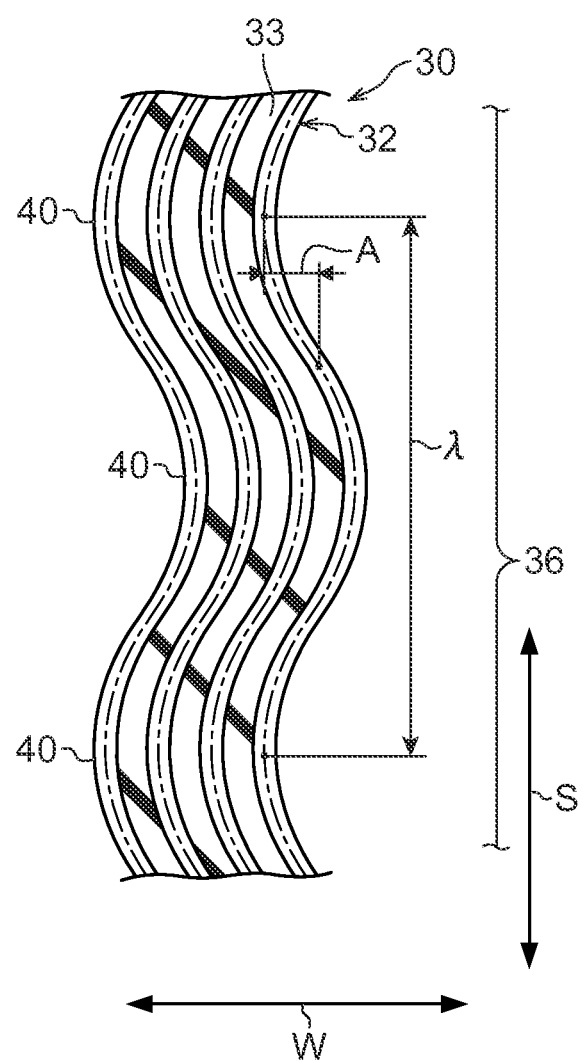
FIG. 9 is an opened-out view of stretching and contracting portions of main cords of a rubber crawler in the state illustrated in FIG. 7, illustrating a state in which the stretching and contracting portions have contracted along the crawler peripheral direction, as viewed from the crawler outer peripheral side.

In the first exemplary embodiment, configuration is made in which the stretching and contracting portions 38 are formed on the one end 32A side positioned on the crawler outer peripheral side of the overlapping portions 36 of the main cords 32. However, the present invention is not limited to such a configuration, and configuration may be made in which the stretching and contracting portions 38 are formed on the other end 32B side positioned on the crawler inner peripheral side of the overlapping portions 36 of the main cords 32. In such a configuration, the stretching and contracting portions 38 formed on the other end 32B side contract in the crawler peripheral direction (see FIG. 9) when the overlapping portions 36 of the main cords 32 are entrained around the sprocket 100 or the idler 102, thereby enabling excessive tensile force to be suppressed from acting on the one end 32A side of the main cords 32.

Configuration may be made in which the stretching and contracting portions 38 are formed on both the one end 32A side and the other end 32B side of the main cords 32. In such a configuration, the stretching and contracting portions 38 formed on the one end 32A side stretch in the crawler peripheral direction, and the stretching and contracting portions 38 formed on the other end 32B side contract in the crawler peripheral direction when the overlapping portions 36 of the main cords 32 are entrained around the sprocket 100 or the idler 102. Excessive tensile force is accordingly suppressed from acting on the one end 32A side of the main cords 32, and excessive compression force is suppressed from acting on the other end 32B side. Note that in the overlapping portions 36, the respective curved portions 40 of the stretching and contracting portions 38 formed on the one end 32A side and the stretching and contracting portions 38 formed on the other end 32B side of the main cords 32 may have the same phase and the same amplitude as each other, or may differ in amplitude and phase. Since tensile force acts on the stretching and contracting portions 38 on the one end 32A side, and compression force acts on the stretching and contracting portions 38 on the other end 32B side, the configuration of the amplitude and wavelength of the stretching and contracting portions 38 on the one end 32A side and the configuration of the amplitude and wavelength of the stretching and contracting portions 38 on the other end 32B side are preferably varied in a manner corresponding to the forces acting thereon.

Second Exemplary Embodiment

Next, explanation follows regarding a rubber crawler according to a second exemplary embodiment of the present invention. Note that configurations matching those of the first exemplary embodiment are allocated the same reference numerals, and explanation thereof is omitted.

Figure 11:
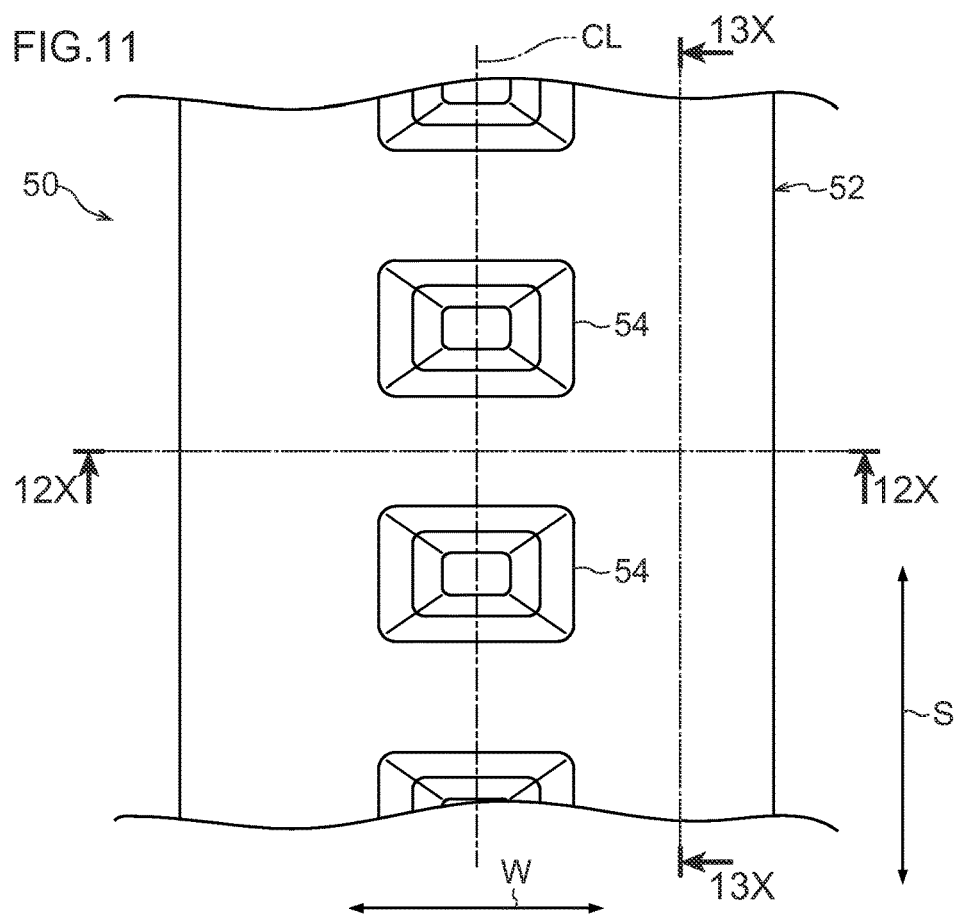
FIG. 11 is a plan view of an inner peripheral face of a rubber crawler of a second exemplary embodiment.
Figure 12:
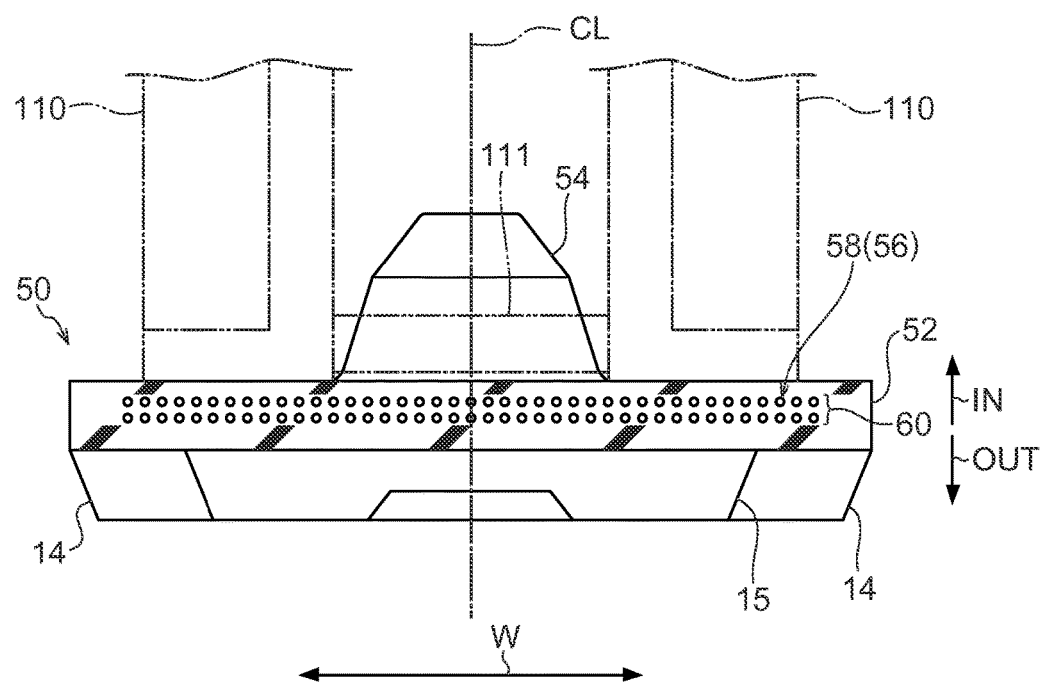
FIG. 12 is a cross-section of the rubber crawler illustrated in FIG. 11, taken along line 12X-12X.
Figure 13:
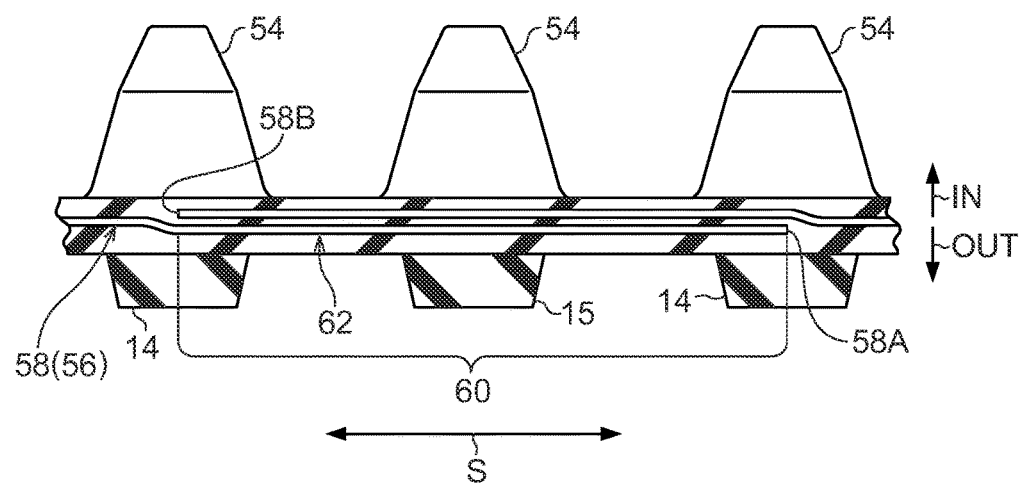
FIG. 13 is a cross-section of the rubber crawler illustrated in FIG. 11, taken along line 13X-13X.

As illustrated in FIG. 11 to FIG. 13, a rubber crawler 50 of the present exemplary embodiment is not a rubber crawler designed for a machine body with a sprocket 100 and an idler 102 such as in the first exemplary embodiment, but is a rubber crawler designed for a machine body with pairs of left and right disk shaped drive wheels 110 and idler wheels (not illustrated in the drawings). The rubber crawler 50 of the present exemplary embodiment is not provided with the cores 20 and the engagement recesses 28 such as those of the rubber crawler 10 of the first exemplary embodiment, but is instead provided with rubber projections 54, being what is known as a coreless rubber crawler.

As illustrated in FIG. 11, the rubber crawler 50 of the present exemplary embodiment includes an endless belt shaped rubber belt 52 (serving as an example of an endless belt shaped elastic body of the present invention). The rubber belt 52 is formed with the rubber projections 54 projecting out toward the crawler inner peripheral side at intervals (uniform intervals in the present exemplary embodiment) along the crawler peripheral direction. The rubber projections 54 make contact with the drive wheels 110 and the idler wheels (not illustrated in the drawings) that roll against an inner peripheral face on both crawler width direction sides of the rubber belt 52 to suppress the rubber crawler 50 from moving relative to the drive wheels 110 and the idler wheels. The rubber crawler 50 of the present exemplary embodiment circulates between the drive wheels 110 and the idler wheels due to drive force transmitted by frictional force of the drive wheels 110 against the inner peripheral face of the rubber belt, and by contact between plural pins 111 spanning between outer circumferential edges of the pair of drive wheels 110 and the rubber projections 54.

As illustrated in FIG. 12 and FIG. 13, a main cord layer 56 is disposed extending along the crawler peripheral direction inside the rubber belt 52. The main cord layer 56 is configured by main cords 58, corresponding to the main cords 32 of the first exemplary embodiment, arranged side-by-side in the crawler width direction. Crawler width direction end portions of the main cord layer 56 are positioned further to crawler width direction end sides of the rubber belt 52 than portions of the rubber belt 52 that contact the drive wheels and the idler wheels.

A stretching and contracting portion 62, corresponding to the stretching and contracting portion 38 of the first exemplary embodiment, is disposed at a one end 58A side of each of the main cords 58. The one ends 58A of the main cords 58 are disposed at the crawler inner peripheral side of a lug 14 or a lug 15 (on the upper side in FIG. 13). Other ends 58B of the main cords 58 are disposed at the crawler outer peripheral side of a rubber projection 54 (on the lower side in FIG. 13).

Next, explanation follows regarding operation and advantageous effects of the rubber crawler 50 of the present exemplary embodiment. Note that explanation regarding operation and advantageous effects of the present exemplary embodiment that are similar to the operation and advantageous effects of the first exemplary embodiment is omitted as appropriate.

In the rubber crawler 50 of the present exemplary embodiment, the one ends 58A of the main cords 58 are disposed at the crawler inner peripheral side of the lug 14 or the lug 15, where there is a thick rubber thickness. Accordingly, for example, excessive bending originating at the one ends 58A can be suppressed in comparison to cases in which the one ends 58A are disposed between the lugs 14 and the lugs 15, where there is a thin rubber thickness.

In the rubber crawler 50, the other ends 58B of the main cords 58 are disposed at the crawler outer peripheral side of the rubber projection 54, where there is a thick rubber thickness. Accordingly, for example, excessive bending originating at the other ends 58B of the main cords 58 can be suppressed in comparison to cases in which the other ends 58B are disposed between the rubber projections 54, where there is a thin rubber thickness. The durability of the coreless rubber crawler 50 can accordingly be increased.

In the first and second exemplary embodiments, the rubber belt 12 or the rubber belt 52 formed from rubber material in an endless belt shape are employed as examples of an endless belt shaped elastic body of the present invention; however the present invention is not limited to such a configuration, and an elastic body with rubber-like elasticity (known as a rubber-like elastic body) formed into an endless belt shaped rubber-like elastic body belt, such as a resin belt formed into an endless belt shape from a resin material with rubber-like elasticity (for example an elastomer), may be employed.

Although explanation has been given regarding exemplary embodiments of the present invention, these exemplary embodiments are merely examples, and various modifications may be implemented within a range not departing from the spirit of the present invention. Obviously, the scope of rights of the present invention is not limited by these exemplary embodiments. Note that the disclosure of Japanese Patent Application No. 2013-034966, filed on Feb. 25, 2013, is incorporated by reference in its entirety in the present specification.

The invention claimed is:

1. A crawler comprising:
an endless belt-shaped elastic body;
a main cord layer that is disposed within the elastic body, that is configured by a plurality of main cords extending along an elastic body peripheral direction and arranged side-by-side in an elastic body width direction, and that is formed with an overlapping portion where both end sides of the main cord layer in the elastic body peripheral direction overlap one another in an elastic body thickness direction; and
a stretching and contracting portion that is formed at the overlapping portion of the main cords, and is capable of stretching and contracting more in the elastic body peripheral direction than other portions of the main cords, wherein:
the stretching and contracting portion includes a curved portion where the main cords are curved with an amplitude in the elastic body width direction as viewed along the elastic body thickness direction,
one end side of each main cord is superimposed on another end side of the main cord from an elastic body outer peripheral side,
stretching and contracting portions are formed on the one end side and the other end side of each main cord,
an amplitude and a wavelength of the stretching and contracting portions on the one end side are different from an amplitude and a wavelength of the stretching and contracting portions on the other end side, and
the stretching and contracting portions formed on the one end side stretch in the elastic body peripheral direction, and the stretching and contracting portions formed on the other end side contract in the elastic body peripheral direction when the overlapping portion of the main cords are entrained around a drive wheel.

2. The crawler of claim 1, wherein:
the stretching and contracting portion includes a plurality of the curved portions; and
as viewed along the elastic body thickness direction, adjacent curved portions in the elastic body peripheral direction curve in mutually opposite directions to each other.

3. The crawler of claim 1, wherein, as viewed along the elastic body thickness direction, curved portions of stretching and contracting portions that are adjacent in the elastic body width direction curve in a same direction as each other.

4. The crawler of claim 3, wherein, as viewed along the elastic body thickness direction, adjacent curved portions in the elastic body peripheral direction are contiguous to each other.

* * * * *